//

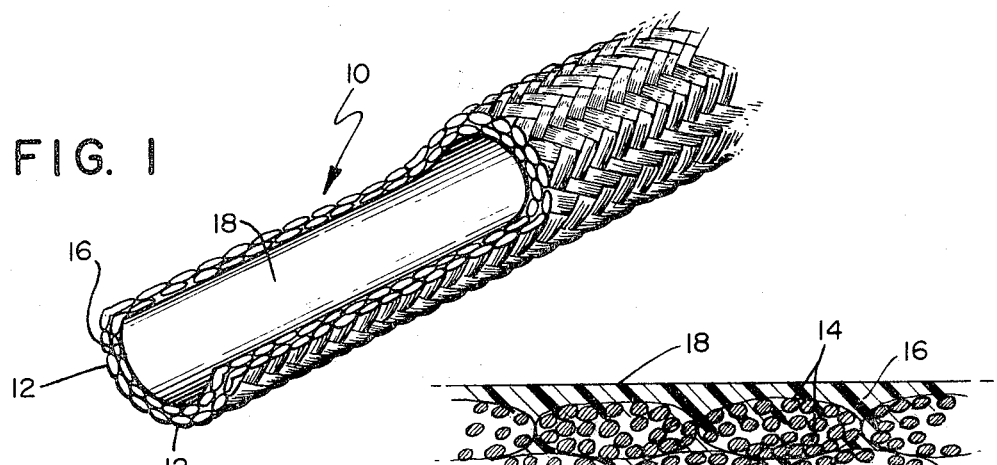
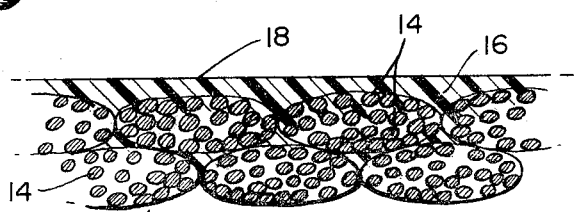
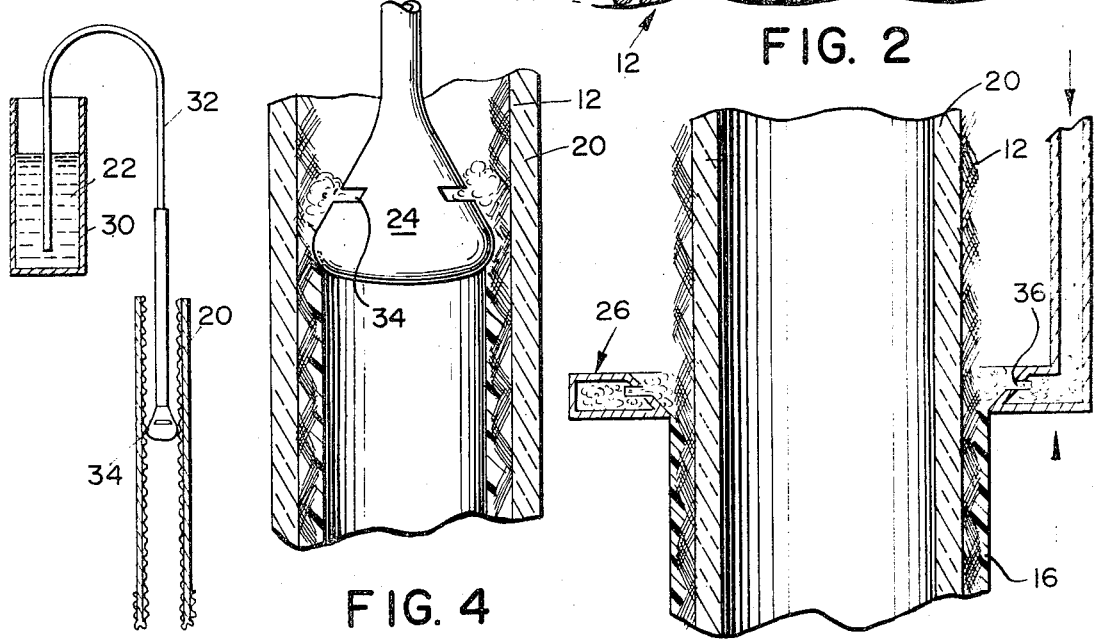
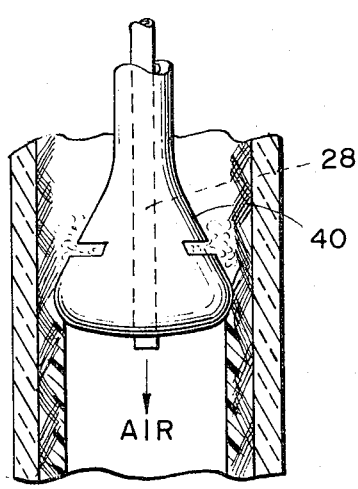

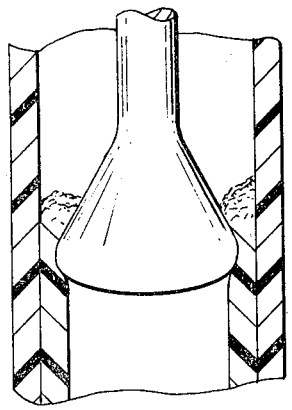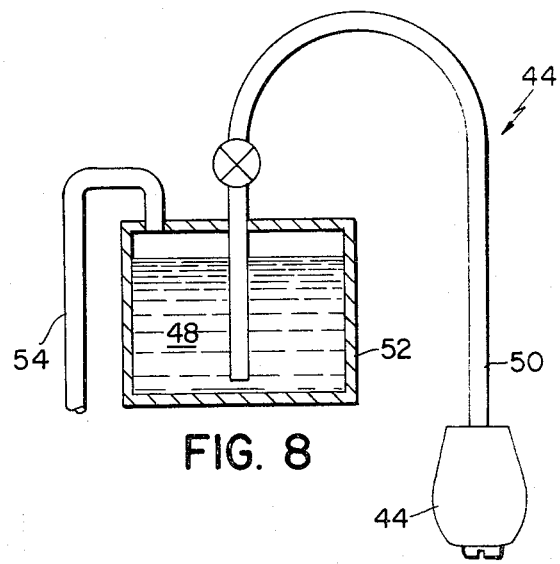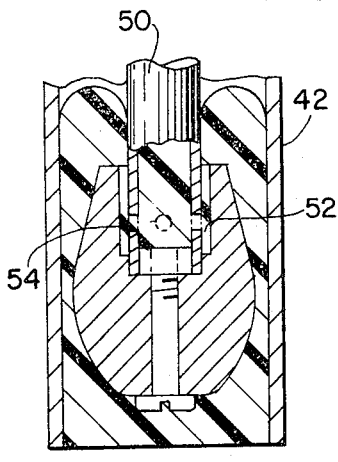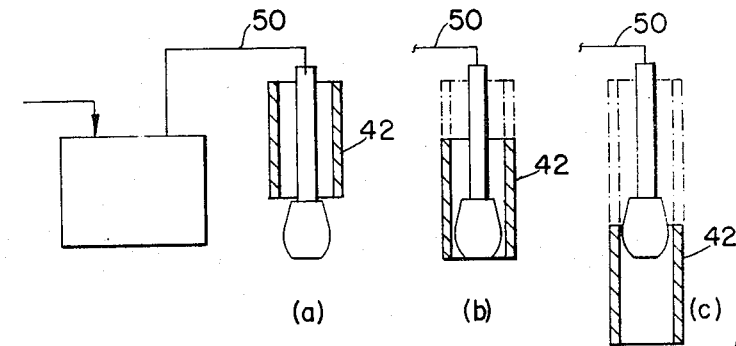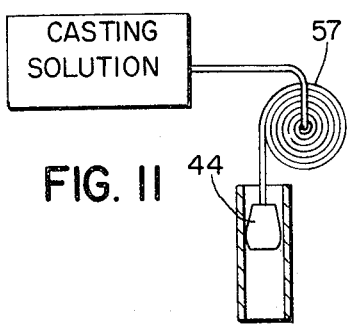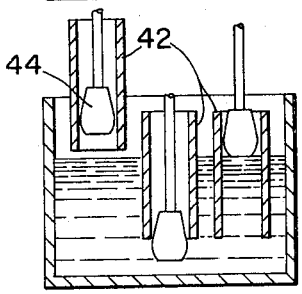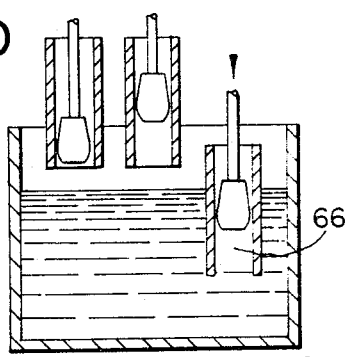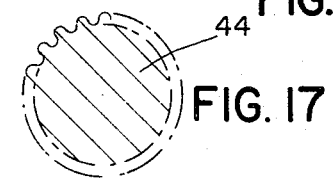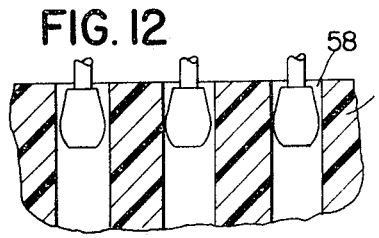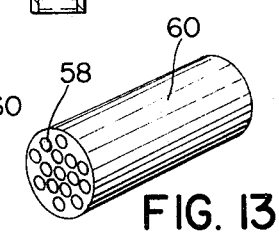

United States Patent Office 3,676,193
Patented July 11, 1972

3,676,193
PROCESS FOR CASTING INTEGRALLY SUPPORTED TUBULAR MEMBRANES
William W. Cooper IV, Sudbury, and Edward M. Shea, Stoneham, Mass., assignors to Abcor, Inc., Cambridge, Mass.
Continuation-in-part of application Ser. No. 658,166, Aug. 3, 1967. This application May 8, 1970, Ser. No. 35,646
Int. Cl. B01d 25/08; B44d 1/02
U.S. Cl. 117—94
27 Claims

ABSTRACT OF THE DISCLOSURE

An apparatus for and method of forming an integrally supported tubular membrane having an inner microporous layer by casting on an interior supporting surface a liquid polymeric composition. Polymeric compositions are applied to the interior of a tubular structure by means of a casting bob which is generally tear-dropped in shape and which is hollow to receive the polymer composition and further which is characterized by apertures in the sides from which the polymeric composition is discharged from the bob onto the adjacent surface.

REFERENCE TO COPENDING APPLICATION

The present application is a continuation-in-part application of U.S. application Ser. No. 658,166, filed Aug. 3, 1967 (now abandoned).

BACKGROUND OF THE INVENTION

Semipermeable membranes are becoming increasingly important for use in separating fluids from solids, particularly dissolved solids, for example, in the desalination of water, in the manufacture of industrial chemicals and in the medical and pharmaceutical industries. A particularly useful employment of such semipermeable membranes is for reverse osmosis applications. Various methods have been employed to reinforce the membrane itself which cannot withstand the necessary pressures which are encountered in such operations. A recent article describes one method for supporting a semipermeable membrane ("A Composite Tubular Assembly for Reverse Osmosis Desalination," Loeb, pp. 35–49, Desalination, 1 (1966)). As described in this article the semipermeable membrane is first separately formed and then wrapped with filter paper and nylon fabric in a cumbersome and time consuming process. The fabrication technique described in the article is deficient in that it fails to produce a film having uniform surface and thickness characteristics with the qualities necessary for a satisfactory integrally supported semipermeable membrane. Another method of casting tubular membranes is disclosed in U.S. Pat. 3,457,150 wherein an apparently disc-shaped doctor blade is used to cast or doctor on the inner walls of a tubular support material a liquid polymeric composition.

Semipermeable membranes are formed from polymeric films deposited from aqueous, solvent or melt compositions. After the liquid film composition is deposited on the substrate the microporous film structure is formed by evaporation of the fluid and the resulting gelling of the polymer. Unlike extrusion, formation of the film by evaporation results in a thin, compact, consolidated surface layer supported by a spongy underlayer. The selectivity in the diffusion and permeation processes is attributed to this consolidated surface layer which is characterized as the "active" layer by the art. The remainder of the film, the spongy underlayer which makes up approximately 99.8% of the total film layer, provides substantially no selection or resistance to flow, thereby permitting the fluids to pass through this layer at a relatively rapid rate. The speed of the separation process is governed by the thickness of the consolidated surface layer. Since this layer is relatively thin in relation to the remainder of the film, separations employing such membranes are relatively fast. For convenience herein the consolidated surface layer will be referred to as the active layer, which is the term employed in the art (see for example, U.S. Pat. No. 3,290,286).

SUMMARY OF THE INVENTION

The present invention comprises a supporting surface impregnated or coated with and covered on at least one surface with a microporous polymeric material, said polymeric material having an active layer on at least one outer surface thereof. The film itself is formed of conventional material known to be employed in forming such membrane. The supporting material may be a fabric-like material composed of monofilamentary material of relatively small diameter which is twisted together or otherwise consolidated to form strands. The strands are then woven to form a closely braided tubular structure. It is important that the strands employed to make up the materials be characterized by a relatively smooth surface which is free from "fuzz"; that is, short fiber ends which project from the surface of the strand. Such projections would penetrate the surface of the microporous film deleteriously affecting the semipermeable efficacy of the membrane. If strands are used, they may also be braided, or knitted and further, the fibers may be nonwoven fibers, such as glass or nylon.

In addition, the tubular supporting surface may comprise resin impregnated fibers or resinous material having interconnected interstices therein, such as open-cell resins. Accordingly, the tubular supporting surface used in our invention may comprise fibrous material alone, fibrous impregnated resinous materials, resinous materials or any combination thereof. Among the resins which are suitable for this use are phenolics, epoxies, polyurethanes, polyesters, acrylics, etc. Also, film or plastic resins such as polyethylene, polyvinyl chloride, polystyrene, etc., may also be used. In addition, the fibrous material or resinous materials either alone or in combination may be sintered to form the desired porosity.

BRIEF DESCRIPTION OF THE DRAWINGS

FIG. 1 is an enlarged view partly in section of the self-supported membrane of the present invention;
FIG. 2 is a cross-sectional view of the membrane;
FIG. 3 is a schematic view illustrating the process employed in forming the membranes of the present invention;
FIG. 4 is a cross-sectional drawing illustrating the process of the present invention and the casting bob employed in said process;
FIG. 5 is a cross-sectional drawing illustrating an alternative method of forming the membrane of the present invention;
FIG. 6 is a cross-sectional drawing illustrating the preparation of the self-supported membrane of the present invention employing the casting bob;
FIG. 7 is a cross-sectional drawing illustrating the preparation of the self-supported membrane of the present invention on a resinous open-celled supporting surface;
FIG. 8 is a schematic illustration of the apparatus employed in our invention;
FIG. 9 is an enlarged sectional view of a peripheral embodiment of the casting bob;
FIGS. 10a, b, and c are a schematic illustration of one embodiment employed in the method of our invention;
FIG. 11 is a schematic illustration wherein a flexible tube is employed in combination with the casting bob for coating elongated tubes;

FIGS. 12 and 13 are a schematic illustration of further alternative embodiments of our invention;

FIGS. 14, 15 and 16 schematically illustrate alternative methods of casting employed with our novel bob; and FIG. 17 is a sectional view of the bob taken along lines 17—17 of FIG. 7.

DESCRIPTION OF THE PREFERRED EMBODIMENT(S)

One embodiment of the present invention is illustrated in FIGS. 1 and 2 wherein tubular membrane 10 is composed of a braided fabric of fibers 12 wherein the fibers are made up of continuous monofilaments 14. The braided supporting fabric is impregnated with polymer 16 which has an active layer 18.

As examples of suitable monofilamentary material which can be employed satisfactorily in the present invention mention may be made of rayon, nylon, polyesters (Dacron), polyolefins, e.g. polyethylene and polypropylene, acrylics, Teflon, and the like. For very high pressure applications high strength materials such as steel fibers and glass fibers are employed. Therefore, for substantially any application the tubular semipermeable membranes of the present invention are used without additional supporting means. However, if desired, such additional support means may be employed for particular applications.

The pressure ranges at which the membranes are employed is limited only by the braided material employed. For example, with rayon, pressures of about 10 to 50 p.s.i.g. are employed. Significantly higher pressures are employed with steel or glass fibers.

Polymeric materials employed in forming the semipermeable membranes are conventional and well known to the art. The particular material is not critical and a wide variety of polymers can be employed. The polymers are deposited from casting solution which is composed of a film forming polymer, a solvent for said polymer and a third material which is miscible with the solvent, but is a nonsolvent or poor solvent for the polymer. The particular membrane material and supporting material should be selected to ensure adequate adhesion.

One integrally supported membrane of the present invention is formed by applying to a tubular, closely-woven structure composed of strands of continuous monofilaments, a casting solution in sufficient quantity to impregnate the supporting material and to form a smooth, thin film layer on at least one surface. Evaporative drying is then applied to the structure to form the active layer on the surface of the polymer.

Normally whether the membrane is cast on the braided fabric or other porous support material, substantially all of the spongy underlayer is absorbed into or forms part of the support to prevent or inhibit undesired compression or compaction. In some instances it may be desired to have a thin support of spongy underlayer disposed between the actual supporting surface, particularly when using the nonbraided support to ensure that the thin membrane skin does not engage directly the support surface as to prevent free flow of the permeate therethrough.

The level of impregnation of the porous support material such as represented by FIGS. 7–13 or the braided material represented by FIGS. 1–6 is not critical. Only sufficient penetration of the porous support or fabric to ensure adequate support and adhesion to the polymer material containing the active layer is necessary. In a preferred embodiment sufficient casting solution is employed to completely penetrate the fabric. Complete penetration of the supporting material provided the greatest degree of support and adhesion. If the supporting material is not completely impregnated, the possibility exists that air could be entrapped and cause voids which would cause weak spots and lead to leaks. That portion of the membrane comprising the spongy porous polymer layer surrounding the supporting material will provide substantially no flow resistance in the employment of the membrane and will not compact under pressure applications. Substantially all the flow resistance of the structure results from the active layer. The thickness of the surface polymeric layer may vary over a wide range; provided that the flow resistance is not excessive. Preferably, the surface layer is less than 5 mils in thickness and the active layer is 0.25 micron or less.

Unlike the prior art in which preformed membranes are supported by sintered steel backing or the like, substantially no compaction of the spongy underlayer of the membrane occurs in pressure applications such as reverse osmosis. In effect we have no backing; our support is integral with the membrane. The supporting material absorbs the pressure and the spongy underlayer is not compressed or compacted.

In one method of preparing the membranes of the present invention the braided supporting material is first formed into a tubular configuration, for example, around a glass tube. The supporting material is then wet with a fluid, e.g., with water and, if desired, stiffened by the application of starch, carboxymethyl-cellulose, polyvinyl pyrrolidone or other conventional fabric stiffening material known to the art. It should be understood that the fluid is not limited to water but can be any appropriate fluid; in the case of rayon, water is preferred; in the case of polyethylene, toluene is preferred. The supporting material is then dried, preferably at elevated temperatures. The tube around which the supporting material was formed is then removed and the tubular supporting material is inserted into a hollow tube of slightly greater diameter to provide the necessary support and shape during the application of the polymer layer. A casting bob is then inserted inside the tubular supporting material. The dimensions of the casting bob and the supporting material are selected to provide the desired deposition of the polymeric material. Polymeric casting solution is then provided to the upper surfaces of the casting bob either by an external feed tube or by the casting bob of the present invention. The casting solution is then applied to the tubular supporting fabric either by drawing the casting bob up the interior of the tubular supporting material or by maintaining the casting bob stationary and moving the tubular supporting material downwardly past the casting bob. In a third alternative both the casting bob and the tubular supporting fabric can be moved in opposite directions at the same time. The casting solution flows around the edges of the bob and onto the film. The clearance between the casting bob and the fabric walls determines the thickness of the surface layer on the fabric.

The rate of the relative motion of the casting bob and/or the tubular supporting material is not critical. The rate of motion should be such, however, that the desired amount of polymer is applied to the tubular material. A too rapid motion may result in insufficient deposition of the polymer. The polymeric material is then air dried to form the active layer. Subsequent to the drying step the thus formed self-supported membrane and the supporting tube in which it was formed is immersed in water. In the water the self-supporting membrane is released from the wall of the supporting tube and readily removed.

The rate of drying is not critical; however, the flux rate and the selectivity of the membrane can be controlled by the drying conditions selected. For example, a relatively short drying rate generally provides a less selective membrane material whereas a prolonged drying operation will produce a highly selective membrane material.

The semipermeable membranes of the present invention can now be handled according to conventional procedures. For example, the membranes are immersed in water to remove the solvent and nonsolvent of the casting solution by replacement with the water. The finished membrane may be surface treated thermally or by solvents and the like in order to provide a specific degree of selectivity. The selectivity can also be controlled by the incorporation into the liquid casting solution of materials, e.g. tellurium tetrabromide or magnesium perchlorate, which are subsequently removed by the water after formation of the membrane. The characteristics of the membrane can be predetermined by the composition of the casting solution. For example, variation of the proportions of solvent, the presence of swelling agents, dopants, or diluents and the like, can effect the relative selectivity of the finished membrane. As mentioned above, the membrane material may be prepared from any suitable film-forming polymeric material known to the art such as cellulose esters, cellulose ethers, denitrofied nitrocellulose, phenol aldehyde, urea aldehyde, acrylics, elastomers and the like. A particularly preferred class of materials are the cellulose esters, more preferably, cellulose acetate and polyion complex resins, e.g. sulfonated polystyrene. The term casting soltuion, as used herein, is intended to refer to solvent solutions, or aqueous polymeric dispersions, and melts. A possible casting solution includes, for example, 25 percent of cellulose acetate, 30 percent of formamide, and 45 percent of acetone. A membrane of this composition on a rayon braided support generally may possess a flow rate with a protein solution of about 20 gallons per day per square foot at about 10 p.s.i.g. as compared with 1500 p.s.i.g. for prior art membranes.

We have discovered a casting bob which is particularly suitable for use in forming semipermeable membranes, but which is also useful for the deposition of any polymer material on the inside of the tubular structure.

The casting bob comprises a substantially circular hollow body with a lower surface and side walls sloping inwardly and upwardly from the lower surface. The side walls contain slots or apertures spaced apart from each other from which coating solution contained in the hollow cavity of the bob is expelled to flow around the bob and onto the adjacent surface to be coated.

The bob may be conventionally supported, as by a wire, with an adjacent conduit for introducing polymeric casting solution into the cavity defined by the walls and the lower surface. In a preferred embodiment, however, the tube which carries polymeric solution to the casting bob also provides the support for the bob. If the method of employing the casting bob involved the motion of a tube passing a stationary bob, the supply tube can be made of rigid material such as glass or stainless steel tubing. However, if a moving bob is desired a flexible supply tube is employed. Preferably, the polymeric solution is under pressure.

In another embodiment the casting bob contains means for introducing an evaporative medium such as air, or other drying gas or liquid, to that portion of the tube upon which polymer has been deposited. The drying atmosphere is provided by a tube which leads through the bob and exits on the lower surface of the bob, thereby providing the drying atmosphere to the polymeric layer immediately after it has been deposited on the tube walls by the passage of the bob. In a particularly preferred embodiment concentric tubes lead to the casting bob; one of said tubes exits in the cavity of the casting bob and carries polymeric material to and the other exit in the lower face of said casting bob to provide the drying atmosphere.

As stated above the casting bob possesses inwardly sloping walls; preferably the casting bob is tear-drop shaped or pear shaped.

One method of forming the membrane of the present invention is illustrated in FIGS. 3 and 4 which show a tubular braided fabric 12 supported by the inner surfaces of a glass tube 20 to maintain the tubular configuration. Polymeric casting solution 22 is passed from reservoir 30 through conduit 32 to casting bob 24 from whence it is fed to the upper surfaces of the casting bob into and onto the adjacent braided supporting fabric to impregnate the fabric and layer 16. As illustrated, the supporting tube 20 and tubular support material 12 are maintained in a stationary position and the casting bob is drawn through the tube in the direction of the arrow.

FIG. 5 illustrates an alternative method of forming the membrane of the present invention wherein the active layer is on the outer surface of the fabric. Glass supporting tube 20 is inserted inside the braided fabric and annular casting knife 26 rings the outer surface of the braided material depositing casting solution through ports 36 to form polymeric layer 16.

In an alternative embodiment, the evaporative drying which forms the active layer is applied to the tubular supporting material. By employing a moving current of drying air, greater efficiencies are achieved in the drying operation as well as providing for consistency of separation characteristics through the membrane by the uniform removal of the solvent employed in the casting solution. The above-mentioned high efficiency drying can be achieved by employing the novel casting bob shown in FIG. 6. The casting bob, which is hollow and contains a passageway for the casting solution to pass through it and out ports 34, also contains a tube 28 which expels air from the lower surface of the casting bob thus providing the evaporative drying conditions to polymeric film 16 which has been applied to the tubular supporting material by the passage of the casting bob.

A still further method of forming the membrane of the present invention is illustrated in FIG. 7 wherein a tubular support surface 42 comprises a self-supporting polymeric resin such as polyethylene having interconnecting interstices. Polymeric casting solution 22 is passed from the reservoir 30 through conduit 32 to casting bob 24 from where it is fed to the upper surfaces of the casting bob and onto the adjacent supporting surface to laminate said surface. As illustrated, the tubular support material 42 moves downwardly while the casting bob is maintained in a stationary position. Alternatively, the supporting material may comprise an olefinic resinous material such as a polyethylene resin having a thickness of about ⅛ to ¾ of an inch, say for example between ¼ to ½ of an inch, and having either a sintered microporous or open-celled structure therein.

An apparatus for dispensing the solution is shown generally in FIG. 8 at 44 and includes a modified casting bob 46 in communication with casting solution 48 through conduit 50. The casting solution is contained in vessel 52. The solution is pressurized by the introduction of a fluid stream, such as nitrogen, into the vessel 52 through conduit 54. A valve 56 controls the flow of the casting solution.

The bob is shown in greater detail in FIG. 9 in a cross-sectional view. The bob 44 is threaded to the bottom of the conduit 50 as shown. The conduit is disposed with a cavity in the bob and the walls of the conduit are spaced apart from the cavity walls. The cavity walls and exterior walls of the conduit define a reservoir 52. The lower portion of the conduit 50 is characterized by a plurality of openings 54 which provide for the flow of casting material 48 from the conduit 50 into the reservoir 52. As shown the outer surface of the bob is essentially egg-shaped and the walls as shown are spaced apart from the conduit walls. However, the walls of the bob may also be in slidable contacting engagement with the conduit walls as desired, depending upon the thickness of the film to be cast, the type casting solution and casting conditions, such as temperature, pressure, viscosity, etc.

The porous tubular support is placed about the casting bob, and moved upwardly until the lower end has passed beyond the top portion of the bob as shown in FIG. 10a. Since the quality of the casting solution is generally quite important the solution is run through the openings 54 of the conduit until the solution is of the desired quality. More specifically, at the beginning of a series of runs it has been found that there may be air bubbles which would be detrimental to the cast membrane. Accordingly, with the tube in the position as shown in FIG. 10a the solution may be run until the desired clarity is reached. This may also be considered a method of flushing the system prior to coating. The porous support tube is lowered as shown schematically in FIG. 10b wherein the tube is slid down over the bob and held until a head of material builds up. Subsequently, the porous tube is moved downwardly, for example by letting it free fall, and the inner wall of the tube is coated in a manner as described before and as shown in FIG. 10c. The pressure of the casting solution from the reservoir is controlled to provide the appropriate flow of casting solution into the bob.

In other embodiments where it is intended to coat tubes of lengthier sizes, say 10 to 40 feet, a flexible conduit 56 may be secured to the bob 44 as shown in FIG. 11. The conduit may be rolled, coiled, etc.

In FIGS. 12 and 13 is shown a still further embodiment of the invention employed in multiple castings. A plurality of tubular passageways 58 are provided in a section of porous material 60. In this manner several tubular supported membranes may be cast in a single operation.

In another preferred embodiment of the invention our casting bob used in forming the membrane is followed by leaching subsequent to the casting either immediately after the membrane is cast or at a fixed period of time thereafter. Referring to FIG. 14, a porous tubular support structure 42 with our novel casting bob 44 therein is shown schematically. The system is flushed as described before and then the bob inserted into the lower portion of the tubular support structure. The tube is then filled with a predetermined amount of the casting solution and as shown in FIG. 14 the entire assembly, that is the tubular support and the casting bob, are immersed in a fluid material such as water. Of course, depending upon the casting solution used and the materials to be leached, other appropriate fluids may be used. After immersion of the assembly into the water, the casting bob is then withdrawn at a predetermined rate thereby coating the casting solution on the inner walls of the tubular support structure as shown. The flow of the water on the cast surface to leach the materials therefrom, such as the solvent and nonsolvent, is enhanced by the vacuum created on the withdrawal of the casting bob which provides a pressure differential for the flow of the water upwardly as the casting bob is withdrawn.

In some instances it is desired that rather than provide immediate leaching as shown in FIG. 14 of the cast membrane, it is preferable to provide a short period of air-drying of the cast surface. In FIG. 15 is shown a schematic illustration wherein a disc 62 is spaced apart from the lower portion of the casting bob 44 to define a fluid-free zone 64. A membrane may be cast using the embodiment as shown in FIG. 15 in a manner similar to that which was described in FIG. 14. That is, the assembly comprising the tubular support structure 42, the casting bob 44, and the disc 62 are immersed into the water, the casting solution having been previously placed within the assembly. The casting bob is withdrawn upwardly from the supporting tube 42 trailed or followed by the disc 62. The disc prevents the flow of the liquid up to and into the space 64. Another method of achieving a fluid-free zone when casting in the embodiments as shown in FIGS. 14 and 15 is shown schematically in FIG. 16 wherein the casting solution is placed in the assembly and prior to the immersion in the water, the casting bob is withdrawn a predetermined amount to commence the casting of the solution on the wall of the support structure. After it has been withdrawn this predetermined amount as shown in FIG. 16b the assembly is then immersed into the water and the bob is continued to be withdrawn until the casting operation is completed. The fluid-free zone 66 which is created when the partially withdrawn bob is inserted into the tube is maintained as the casting bob is withdrawn.

Although the casting bob has been described and shown generally having smooth outer walls, if desired to impart some irregularity or nonsmooth surface to the cast membrane, the outer walls of the casting bob may be fluted or serrated as shown in FIG. 17, which is a sectional view of FIG. 10 taken along line 17—17. Through use of a casting bob having this type of surface, a membrane having a fluted or serrated effect can be provided. Also if the casting bob is rotated or twisted while casting the solution on the porous support structure then a helical effect may be given to the crest and roots of the fluted sides to increase the effective surface area and provide for turbulence. The turbulence aids in providing a self-cleaning effect for the membrane walls. For example, as the casting bob is withdrawn from one to the other end of the porous support structure, it may be rotated a slight degree or a greater number of degrees, say for example, from 5 to 180°, to impart a helical twist to the roots and crest of the fluted sides. Of course if desired, the porous support structure may be rotated while the bob remains stationary or both may be rotated.

The tubular support structure as described in embodiments represented by FIGS. 7–16 should have adequate porosity in the form of interconnected voids to permit the solvent which is passed through the membrane to pass through the tube. Any type of resinous material for the supporting tube either alone or in combination with other fibrous support materials may be used. Some suitable resins which may be used include phenolics, epoxies, polyurethanes, polyesters, acrylics, etc., or additionally thermoplastic resins such as olefinic resins such as polyethylene, polypropylene, polyvinyl chloride, polystyrene, etc., may also be used. The necessary porosity can be imparted to the support tube by any of a number of methods as long as the tube is characterized by interconnected interstices. These interconnected interstices may be produced through the use of open-celled foam materials wherein a large percentage of the cells are interconnected, such as through the use of blowing agents in the preparation of foamed plastics. Another method of producing the porous support structure having the interconnected interstices is through the use of sintered particles such as powdered olefinic resins, for example, polypropylene.

The novel self-supported membranes of the present invention are suitable for use in a wide variety of applications. The membranes are particularly useful in protein ultra filtration where rejection of a high molecular weight component is desired. Other particularly useful applications include antibiotic separations concentration and purification, food concentration, sugar and starch separation, protein separation from whisky still bottoms, and various other filtrations. Other examples of separatory operations to which the membranes can be applied are described in U.S. Pat. Nos. 3,228,876 and 3228,877, which are incorporated by reference herein in their entirety.

What is claimed is:
1. The method of forming an integrally supported tubular membrane which method comprises:
   (a) providing a tubular braided fabric material comprising a multiplicity of strands of a smooth continuous monofilament essentially free of short fiber ends which project from the surface of the strands;
   (b) casting onto one surface of the braided material a liquid film-forming polymeric composition comprising a film-forming polymer, a solvent for the polymer and a nonsolvent for the polymer which nonsolvent is miscible with the solvent;
   (c) impregnating the braided material with said polymeric composition to form a smooth thin-film layer on the cast surface of the material; and
   (d) gelling the thin-film layer of the polymeric composition and forming thereon an active layer thereby providing an integrally supported tubular membrane.

2. The method as defined in claim 1 wherein the gelling of the polymeric composition and forming of the active layer includes the evaporative drying of the polymeric composition.

3. The method as defined in claim 1 which includes immersing the impregnated braided material in a leaching solution for said solvent and nonsolvent.

4. The method of claim 1 which includes impregnating the braided material with said polymeric composition to penetrate completely the braided material.

5. The method of claim 1 which includes casting and impregnating the braided material with said polymeric compositon on the inner surface of the tubular braided material.

6. The method of claim 1 wherein the film-forming polymer is selected from the group consisting of cellulose esters, cellulose ethers and sulfonated polystyrene.

7. The method of claim 1 which includes, prior to casting and impregnating steps, the wetting of the surface of the tubular braided fabric material with a liquid.

8. The method of claim 1 which includes:
 (a) inserting the braided material into a supporting tube of slightly larger diameter than the braided material;
 (b) inserting a casting bob into the tubular braided material the dimensions of the casting bob selected to provide the desired impregnation of the polymeric composition;
 (c) introducing the liquid compositions from the casting bob into the space between the casting bob and the inner surface of the braided material; and
 (d) moving the casting bob relative to the supporting and the braided material so as to cast the polymeric composition onto the inner surface of the braided material.

9. The method of claim 1 which includes casting and impregnating the braided material with said polymeric composition on the outer surface of the tubular braided material.

10. The method of claim 1 wherein the fabric material comprises a layer of braided strands which layer is a double layer of braided strands wherein the strands are generally elliptically shaped, the elliptical strands of one layer overlapping the strand interstices of the other layer to present an essentially smooth flat surface on both sides of the strands.

11. The method of claim 1 wherein the monofilaments are selected from the group of monofilament materials consisting of rayon, nylon, polyesters, polyolefins, acrylic, Teflon, and combinations thereof.

12. The method of claim 1 wherein the monofilaments are resin-impregnated glass fibers.

13. The method of claim 1 wherein the monofilaments are resin-impregnated nylon fibers.

14. The method of claim 1 which includes casting the composition as an irregular nonsmooth thin film layer and gelling the cast layer in said irregular nonsmooth form to provide increased surface area of the cast membrane.

15. The method of claim 1 which includes casting the composition having an exposed fluted surface, the roots and crests of the fluted surface substantially aligned with the axis of the tubular support material, and gelling the composition as a membrane having an exposed fluted surface.

16. The method of claim 15 which includes casting the fluted surface wherein the roots and crests are offset from one to the other end of the tubular support surface and gelling the cast film wherein the finally cast membrane has a helical effect imparted thereto to promote turbulence to the fluid stream flowing therethrough.

17. The method of claim 2 which includes drying the cast polymeric composition by flowing a current of air over said polymeric composition.

18. The method of claim 3 wherein the leaching solution is water.

19. The method of claim 8 which includes providing a fluid barrier spaced apart from the casting bob;
 defining a drying zone between the casting bob and the fluid barrier;
 drying the cast membrane as the casting bob is withdrawn from the braided material as the drying zone passes over said membrane;
 leaching the solvent and nonsolvent from the membrane material subsequent to the passage of the drying zone.

20. A method of forming an integrally supported tubular membrane which method comprises:
 (a) providing a tubular braided fabric material comprising a multiplicity of strands of smooth, continuous, resin-impregnated glass fibers essentially free of short fiber ends which project from the surface of the strands;
 (b) casting onto the inner surface of the braided material a liquid film-forming polymeric composition comprising cellulose acetate, a solvent for the cellulose acetate, and a nonsolvent for the cellulose acetate, which nonsolvent is miscible with the solvent;
 (c) impregnating the braided material with the polymeric composition to form a smooth thin-film layer on the cast surface of the material; and
 (d) gelling the thin-film layer of the polymeric composition and forming thereon an active layer thereby providing an integrally supported tubular membrane.

21. In a method of forming a supported membrane wherein a liquid film-forming polymeric composition is cast onto the walls of a generally tubular support material and the composition gells to form a semipermeable membrane having an active layer thereon, the improvement which comprises:
 casting a fluted thin layer of the liquid film-forming polymeric composition onto the wall of the support material; and
 gelling the cast layer to form an integrally supported membrane having a fluted cast surface to provide an increased membrane surface.

22. The method of claim 21 which includes casting the composition to provide an exposed fluted surface, the roots and crests of the fluted surface substantially aligned with the axis of the tubular support material; and gelling the composition to provide a membrane having an exposed fluted surface.

23. The method of claim 22 which includes casting the fluted surface wherein the roots and crests are offset from one to the other end of the tubular support surface, and gelling the cast film wherein the finally cast membrane has a helical effect of roots and crests imparted thereto.

24. The method of claim 21 wherein the support material is an olefinic resin.

25. The method of claim 21 wherein the support material comprises resin-impregnated glass fiber.

26. The method of claim 21 wherein the support material is a braided tube.

27. The method of claim 24 wherein the olefinic resin is sintered polypropylene.

References Cited

UNITED STATES PATENTS 3,544,358  12/1970  Mantikian _____ 210—490 X
3,446,359   5/1969  Loeb et al. _____ 210—321 X
3,457,170   7/1969  Havens _____ 210—490 X EDWARD G. WHITBY Primary Examiner U.S. Cl. X.R.

99—1; 117—95, 124 D, 138.8 E, 138.8 F, 161 C, 161 UZ; 118—317, 323; 210—23, 321, 490; 264—41; 424—123